US009019219B2

(12) United States Patent  
Cheong et al.

(10) Patent No.: US 9,019,219 B2  
(45) Date of Patent: Apr. 28, 2015

(54) TOUCH SCREEN PANEL

(75) Inventors: Woo-Seok Cheong, Daejeon (KR); Jaeheon Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 397 days.

(21) Appl. No.: 13/546,519

(22) Filed: Jul. 11, 2012

(65) Prior Publication Data

US 2013/0016054 A1 Jan. 17, 2013

(30) Foreign Application Priority Data

Jul. 11, 2011 (KR) .................. 10-2011-0068601  
Jun. 7, 2012 (KR) .................. 10-2012-0060929

(51) Int. Cl.
*G06F 3/041* (2006.01)
*G06F 3/044* (2006.01)

(52) U.S. Cl.
CPC ...... *G06F 3/044* (2013.01); *G06F 2203/04103* (2013.01)

(58) Field of Classification Search
CPC .... G06F 3/0488; G06F 3/04883; G06F 3/044
USPC ............ 345/173–179; 178/18.01–18.04
See application file for complete search history.

(56) References Cited

U.S. PATENT DOCUMENTS

| | | | |
|---|---|---|---|
| 2009/0146945 A1 | 6/2009 | Cho | |
| 2009/0201268 A1* | 8/2009 | Endo et al. | 345/174 |
| 2010/0001975 A1* | 1/2010 | Jiang et al. | 345/174 |
| 2010/0117983 A1* | 5/2010 | Lin et al. | 345/174 |
| 2010/0117984 A1* | 5/2010 | Lin et al. | 345/174 |
| 2010/0156795 A1 | 6/2010 | Kim et al. | |
| 2010/0182274 A1 | 7/2010 | Kang et al. | |
| 2010/0231542 A1 | 9/2010 | Momose | |
| 2011/0037722 A1* | 2/2011 | Tseng et al. | 345/174 |
| 2011/0141037 A1* | 6/2011 | Hwang et al. | 345/173 |
| 2011/0181542 A1* | 7/2011 | Yang | 345/174 |
| 2011/0226536 A1* | 9/2011 | Lin et al. | 178/18.03 |
| 2012/0013554 A1* | 1/2012 | Nam et al. | 345/173 |
| 2012/0044191 A1* | 2/2012 | Shin | 345/174 |
| 2012/0098790 A1 | 4/2012 | Han | |

FOREIGN PATENT DOCUMENTS

| | | |
|---|---|---|
| CN | 201210288 Y | 3/2009 |
| CN | 101452351 A | 6/2009 |
| CN | 101853115 A | 10/2010 |

(Continued)

*Primary Examiner* — Kimnhung Nguyen  
(74) *Attorney, Agent, or Firm* — Rabin & Berdo, P.C.

(57) ABSTRACT

Touch screen panels are provided. The touch screen panel may include a first hybrid electrode including first electrode cells arranged on a substrate in a first direction and first connection electrodes connecting the first electrode cells to each other in the first direction, and a second hybrid electrode spaced apart from the first hybrid electrode on the substrate. The second hybrid electrode may include second electrode cells arranged in a second direction crossing the first direction and second connection electrodes connecting the second electrode cells to each other in the second direction. The second electrode cells are disposed between the first connection electrodes. The first hybrid electrode may include a first lower transparent layer and a first metal layer which are sequentially stacked, and the second hybrid electrode may include a second lower transparent layer and a second metal layer which are sequentially stacked.

16 Claims, 8 Drawing Sheets

(56) References Cited

FOREIGN PATENT DOCUMENTS

| | | |
|---|---|---|
| JP | 2010-211647 A | 9/2010 |
| JP | 2010-211823 A | 9/2010 |
| JP | 2010-257492 A | 11/2010 |
| KR | 10-2008-0054318 A | 6/2008 |
| KR | 10-2009-0059726 A | 6/2009 |
| KR | 10-2010-0051292 A | 5/2010 |
| KR | 10-2010-0065486 A | 6/2010 |
| KR | 10-2010-0073546 A | 7/2010 |
| KR | 10-2011-0000722 A | 1/2011 |
| KR | 10-1025023 B1 | 3/2011 |
| KR | 10-1066111 B1 | 9/2011 |
| KR | 10-1076236 B1 | 10/2011 |
| KR | 10-1099031 B1 | 12/2011 |
| WO | WO 2008/072900 A1 | 6/2008 |

\* cited by examiner

TOUCH SCREEN PANEL

CROSS-REFERENCE TO RELATED APPLICATIONS

This U.S. non-provisional patent application claims priority under 35 U.S.C. §119 to Korean Patent Application Nos. 10-2011-0068601 and 10-2012-0060929, filed on Jul. 11, 2011 and Jun. 7, 2012, the entirety of which is incorporated by reference herein.

BACKGROUND

The inventive concept relates to touch screen panels and, more particularly, to touch screen panels having hybrid electrodes.

Recently, electronics devices such as computers and portable communication terminals have been generalized, such that touch screens have been widely used as units for inputting data. The touch screens may be classified into a resistance touch screen, a capacitance touch screen, a surface acoustic wave (SAW) touch screen, and an infrared beam touch screen.

If the resistance touch screen is touched with a finger or a pen, transparent electrodes of lower and upper substrates are in contact with each other to generate an electrical signal. The touched position is located using the generated electrical signal. The resistance touch screen may have advantages such as low cost, high light transmission, multi-touch, high response speed, and small size. Thus, the resistance touch screen may be mainly applied to a personal digital assistant (PDA), a portable multimedia player (PMP), a navigation system, and a headset. According to the capacitance touch screen, if a conductor (e.g., a finger) is touched to a substrate including a transparent electrode, a certain capacitance occurs at an insulating layer by static electricity generated through the finger. A signal is transmitted through a portion at which the capacitance occurs and then a size of the signal is calculated to locate a touch position. If an acoustic wave meets an obstacle, amplitude of the acoustic wave is reduced. The SAW touch screen uses a technique sensing the reduction of the amplitude of acoustic wave. The SAW touch screen has advantages such as high light transmission, high accuracy, high definition, such that the SAW touch screen may be used in an automatic teller terminal installed at an external place. However, a sensor of the SAW touch may be easily contaminated and the SAW touch may be weakened by liquid. The IR touch screen uses properties of infrared rays such as straightness and interruption caused by an obstacle. The IR touch screen may be realized by one glass sheet without an indium tin oxide (ITO) film or a glass substrate. The IR touch screen may have most excellent transmission.

The capacitance touch screen of the various kinds of touch screens may perform a multi-touch function corresponding to the basic of sensitivity touch and be used in a high transmission sensor. Thus, the capacitance touch screen may be applied to a display having a large area and a thin thickness and capable of performing the sensitivity touch function.

SUMMARY

Embodiments of the inventive concept may provide touch screen panels capable of being simply manufactured to reduce manufacture cost.

According to embodiments of the inventive concept, a touch screen panel may include: a substrate; a first hybrid electrode including first electrode cells arranged on the substrate in a first direction and first connection electrodes connecting the first electrode cells to each other in the first direction; and a second hybrid electrode spaced apart from the first hybrid electrode on the substrate, the second hybrid electrode including second electrode cells arranged in a second direction crossing the first direction and second connection electrodes connecting the second electrode cells to each other in the second direction, and the second electrode cells disposed between the first connection electrodes. The first hybrid electrode may include a first lower transparent layer and a first metal layer which are sequentially stacked; and the second hybrid electrode may include a second lower transparent layer and a second metal layer which are sequentially stacked.

In some embodiments, the second connection electrodes may extend on the first connection electrodes.

In other embodiments, the first metal layer may be directly in contact with the second lower transparent layer.

In still other embodiments, each of the first lower transparent layer and the second lower transparent layer may have a refractive index within a range of about 1.9 to about 2.65.

In even other embodiments, the first metal layer and the second metal layer may include Ag or an Ag-alloy.

In yet other embodiments, the touch screen panel may further include: a first transparent metal oxide layer on the first metal layer; and a second transparent metal oxide layer on the second metal layer. The first transparent metal oxide layer may be directly in contact with the second lower transparent layer.

In yet still other embodiments, each of the first and second transparent metal oxide layers includes ITO, IZTO, IZO, AZO, or GZO.

In yet still other embodiments, the touch screen panel may further include: a buffer layer disposed between the substrate and the first hybrid electrode and between the substrate and the second hybrid electrode.

In yet still other embodiments, the buffer layer may have a refractive index within a range of about 1.7 to about 2.65 and a thickness within a range of about 6 nm to about 80 nm.

In yet still other embodiments, the buffer layer may include a first buffer layer and a second buffer layer on the first buffer layer; and the first buffer layer may have a refractive index greater than a refractive index of the second buffer layer.

In yet still other embodiments, the touch screen panel may further include; an optically clear adhesive disposed on the first hybrid electrode and the second hybrid electrode.

BRIEF DESCRIPTION OF THE DRAWINGS

The inventive concept will become more apparent in view of the attached drawings and accompanying detailed description.

DETAILED DESCRIPTION OF THE EMBODIMENTS

Figure 1:
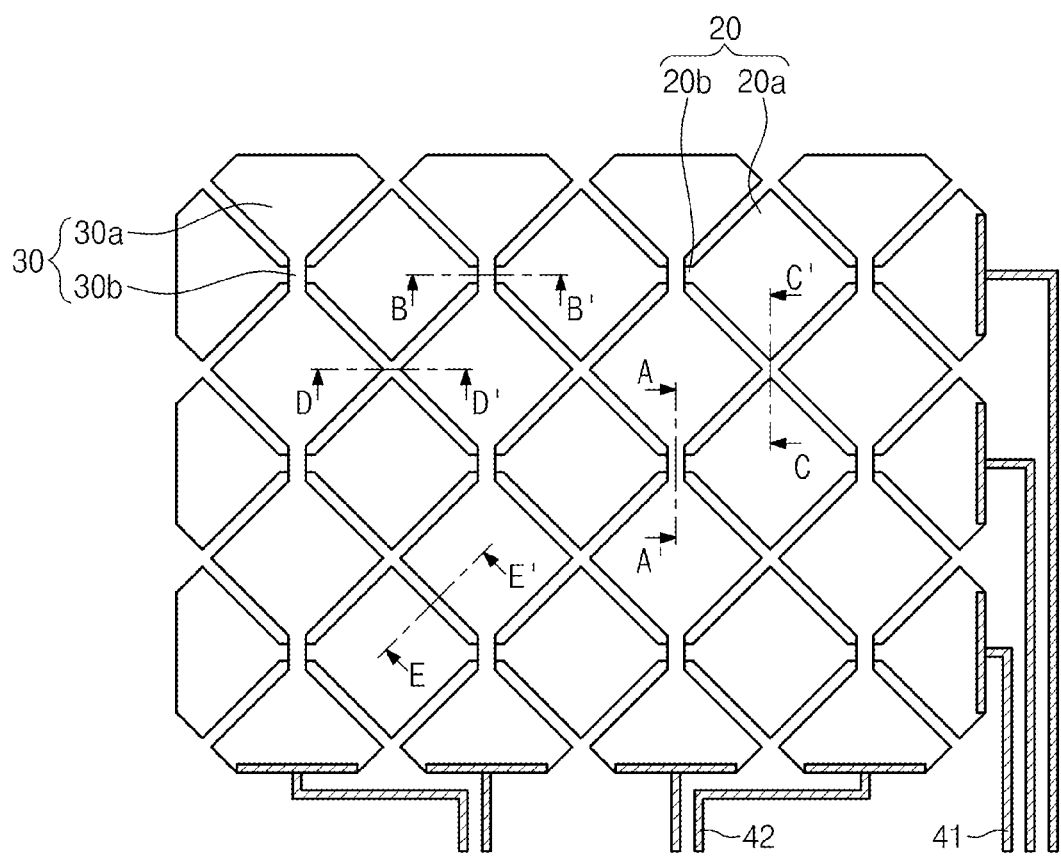
FIG. 1 is a plan view a touch screen panel according to embodiments of the inventive concept.
Figure 2A:
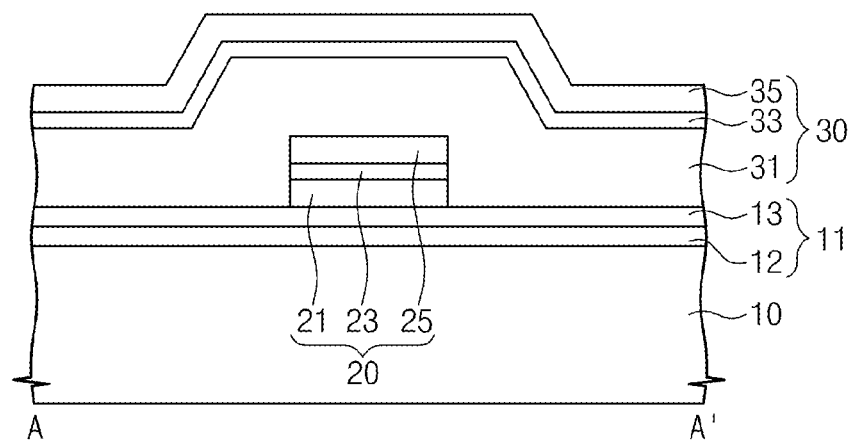
FIGS. 2A, 2B, 2C, 2D, and 2E are cross-sectional views taken along lines A-A', B-B', C-C', D-D', and E-E' of FIG. 1, respectively, to explain a touch screen panel according to some embodiments of the inventive concept.
Figure 2B:
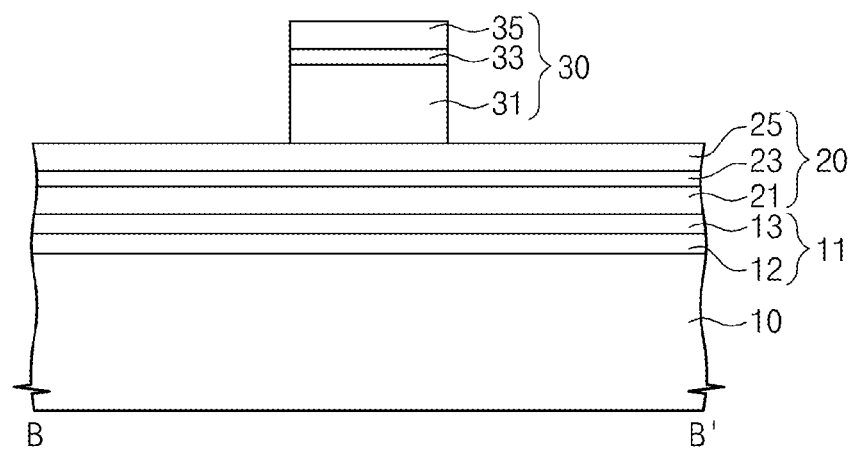
Figure 2C:
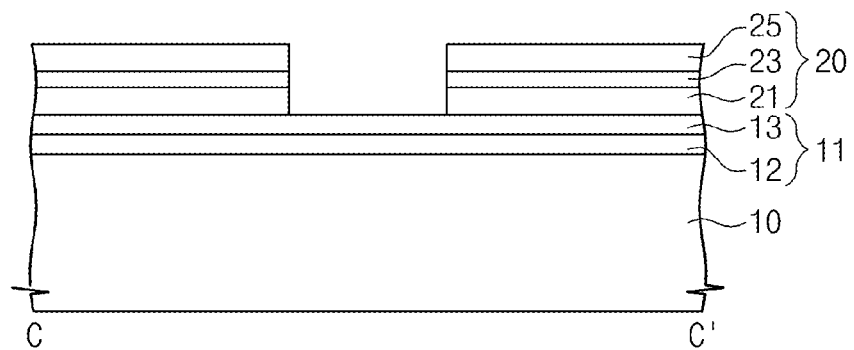
Figure 2D:
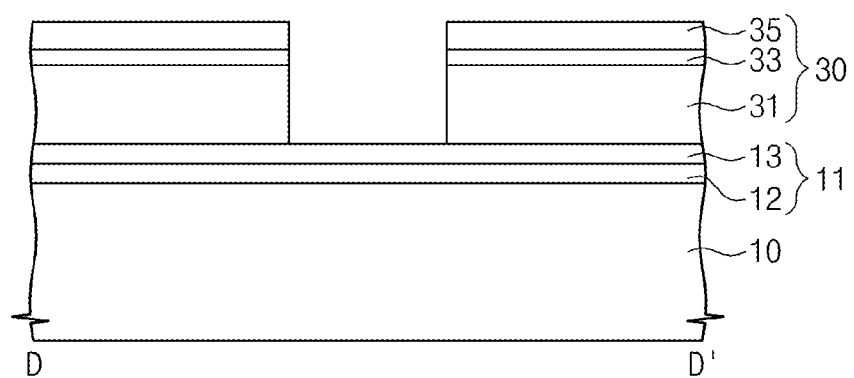
Figure 2E:
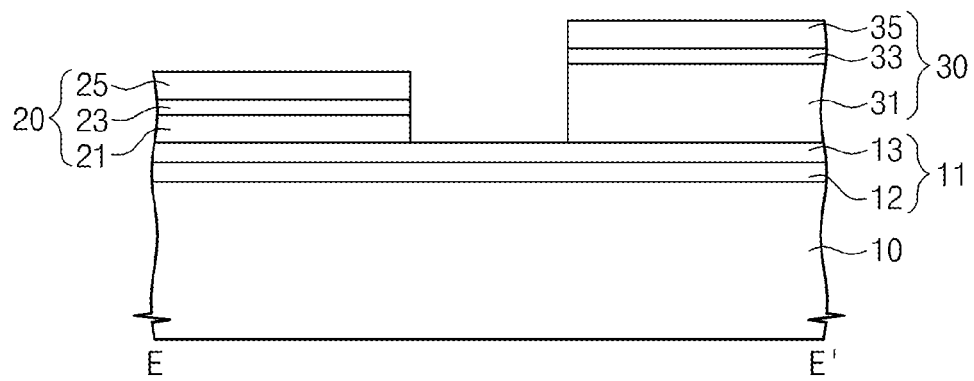

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

FIG. 1 is a plan view a touch screen panel according to embodiments of the inventive concept. Referring to FIG. 1, a touch screen panel according to embodiments of the inventive concept includes a first hybrid electrode 20 extending in a first direction on a substrate and a second hybrid electrode 30 extending in a second direction crossing the first direction. A first interconnection 41 and a second interconnection 42 are connected to the first hybrid electrode 20 and the second hybrid electrode 30, respectively. The first hybrid electrode 20 may be an X-axis electrode and the second hybrid electrode 30 may be a Y-axis electrode.

A first hybrid electrode 20 may include first electrode cells 20a arranged in the first direction and first connection electrodes 20b connecting the first electrode cells 20a to each other in the first direction. Each of the first electrode cells 20a may have a diamond-shape. Two of vertex-portions of each of the first electrode cells 20a may neighbor to each other in a left-right direction and face each other, and the other two of the vertex-portions of each of the first electrodes 20a may neighbor to each other in an up-down direction and face each other. Each of the first connection electrodes 20b may connect vertex-portions of the neighboring first electrode cells 20a to each other in the first direction. However, the inventive concept is not limited thereto. Each of the first electrode cells 20a may have one of various shapes such as the diamond-shape, a rectangle-shape, a square-shape, and a polygon-shape.

The second hybrid electrode 30 may include second electrode cells 30a arranged in the second direction and disposed between the first connections electrodes 20b, and second connection electrodes 30b connecting the second electrode cells 30a to each other in the second direction. The second electrode cells 30a may be disposed between the first electrodes 20b in order not to be in contact with the first hybrid electrode 20. Each of the second electrode cells 30a may have a diamond-shape. However, the inventive concept is not limited thereto. Each of the second electrode cells 30a may have one of various shapes such as the diamond-shape, a rectangle-shape, a square-shape, and a polygon-shape.

The second connection electrodes 30b may extend over the first connection electrodes 20b.

Each of widths of the first and second connections 20b and 30b may be within a range of about 20 μm to about 2000 μm. Each of a distance between the first electrode cells 20a adjacent to each other and a distance between the second electrode cells 30a adjacent to each other may be within a range of about 20 μm to about 2000 μm. A distance between the first and second electrode cells 20a and 30a adjacent to each other may be within a range of about 10 μm to about 1000 μm.

The first and second interconnections 41 and 42 may be provided at an edge portion of the touch screen panel. The first interconnection 41 may be a driving line which is connected to the first hybrid electrode 20 so as to transmit a current signal. The second interconnection 42 may be a sensing line which is connected to the second hybrid electrode 30 to sense a current signal. Each of the first and second interconnections 41 and 42 may be within a range of about 20 μm to about 200 μm. A distance between the first interconnections 41 adjacent to each other may be within a range of about 20 μm to about 2000 μm. A distance between the second interconnections 42 adjacent to each other may be within a range of about 20 μm to about 2000 μm. A thickness of each of the first and second interconnections 41 and 42 may be within a range of about 100 μm to about 1000 μm. The thickness of each of the first and second interconnections 41 and 42 may be changed by a size of the touch screen panel and resistance values of the first and second interconnections 41 and 42. The first and second interconnections 41 and 32 may be a single-layered or multi-layered metal layer including one of molybdenum (Mo), aluminum (Al), copper (Cu), chromium (Cr), silver (Ag), titanium/copper (Ti/Cu), titanium/silver (Ti/Ag), chromium/silver (Cr/Ag), chromium/copper (Cr/Cu), aluminum/copper (Al/Cu), and molybdenum/aluminum/molybdenum (Mo/Al/Mo).

FIGS. 2A, 2B, 2C, 2D, and 2E are cross-sectional views taken along lines A-A', B-B', C-C', D-D', and E-E' of FIG. 1, respectively, to explain a touch screen panel according to some embodiments of the inventive concept.

Referring to FIGS. 2A to 2E, a substrate 10 is provided. The substrate 10 may be a chemically tempered glass substrate, a reinforced plastic substrate, a polycarbonate (PC) substrate coated with a reinforced film, or a polyethylene terephthalate (P.E.T) substrate.

A buffer layer 11 is formed on the substrate 10. The buffer layer 11 may include a first buffer layer 12 and a second buffer layer 13 sequentially stacked. The first buffer layer 12 may have a thickness within a range of about 2 nm to about 20 nm. The first buffer layer 12 may be an insulating layer having a high refractive index. The first buffer layer 12 may be a transparent insulating layer having the refractive index within a range of about 1.8 to about 2.9. The first buffer layer 12 may be formed of one of $TiO_2$, $Nb_2O_5$, $ZrO_2$, $Ta_2O_5$, and $HfO_2$. The second buffer layer 13 may have a thickness within a range of about 20 nm to about 100 nm. The second buffer layer 13 may be an insulating layer having a low refractive index. The second buffer layer 13 may have a refractive index smaller than that of the first buffer layer 12. The second buffer layer 13 may be a transparent insulating layer having the refractive index within a range of about 1.3 to about 1.8. The second buffer layer 13 may be formed of one of $SiO_2$, $SiN_x$, $MgF_2$, and $SiO_xN_y$. The first and second buffer layer 12 and 13 may be formed a screen printing method, a physical vapor deposition (PVD) method, a chemical vapor deposition (CVD) method, or an atomic layer deposition (ALD) method.

The buffer layer 11 may be formed of only one of the first buffer layer 12 and the second buffer layer 13. For example, the buffer layer 11 may be a transparent insulating layer having a refractive index within a range of about 1.7 to about 2.65 and a thickness within a range of about 6 nm to about 80 nm. For example, the buffer layer 11 may be formed of one of $TiO_2$, $Nb_2O_5$, $ZrO_2$, $Ta_2O_5$, and $HfO_2$.

The first hybrid electrode 20 is formed on the buffer layer 11. The first hybrid electrode 20 may include a first lower transparent layer 21, a first metal layer 23, and a first transparent metal oxide layer 25 which are sequentially stacked. The first lower transparent layer 21, the first metal layer 23, and the first transparent metal oxide layer 25 may be patterned simultaneously. As illustrated in FIG. 1, the first hybrid electrode 20 may include the first electrode cells 20a arranged in the first direction, and the first connection electrodes 20b connecting the first electrode cells 20a in the first direction. The first lower transparent layer 21 may have a refractive index within a range of about 1.9 to about 2.65. The first lower transparent layer 21 may have a thickness within a range of about 10 nm to about 30 nm. The first lower transparent layer 21 may be formed of at least one of ZnO, ZITO ($ZnO+In_2O_3+SnO_2$), $SiO_2$, $SnO_2$, ZTO ($ZnO+SnO_2$), $TiO_2$, AZO (Al-doped ZnO), GZO (Ga-doped ZnO), SiNx, ITO ($In_2O_3+SnO_2$), IZO ($In_2O_3+ZnO$), and any compound thereof. The first metal layer 23 may have a thickness within a range of about 6 nm to about 12 nm. The first metal layer 23 may be formed of silver (Ag) or an Ag-alloy. The Ag-alloy may be a binary or ternary metal such as Ag—Al, Ag—Mo, Ag—Au, Ag—Pd, Ag—Ti, Ag—Cu, Ag—Au—Pd, or Ag—Au—Cu. The first transparent metal oxide layer 25 may have a thickness within a range of about 30 nm to about 60 nm. The first transparent metal oxide layer 25 may be formed of ITO ($In_2O_3+SnO_2$), IZTO ($ZnO+In_2O_3+SnO_2$), IZO ($In_2O_3+ZnO$), AZO (Al-doped ZnO), or GZO (Ga-doped ZnO).

The second hybrid electrode 30 may include a second lower transparent layer 31, a second metal layer 33, and a second transparent metal oxide layer 35 which are sequentially stacked. The second lower transparent layer 31, the second metal layer 33, and the second transparent metal oxide layer 35 may be patterned simultaneously. As illustrated in FIG. 1, the second hybrid electrode 30 may include the second electrode cells 30a arranged in the second direction, and the second connection electrodes 30b connecting the second electrode cells 30a in the second direction. The second lower transparent layer 31 may be an insulating layer having a refractive index within a range of about 1.9 to about 2.65. The second lower transparent layer 31 may have a thickness within a range of about 100 nm to about 300 nm. The second lower transparent layer 31 may be formed of at least one of $SiO_2$, $SiN_x$, $SiO_xN_y$, and $Al_2O_3$. The second lower transparent layer 31 may have a step-coverage of about 20% or more. The second lower transparent layer 31 may be formed by an ionized physical vapor deposition (IPVD) process, an ALD process, a plasma-enhanced CVD (PE-CVD) process, or a solution process. The second metal layer 33 may have a thickness within a range of about 6 nm to about 12 nm. The second metal layer 33 may be formed of Ag or an Ag-alloy. The Ag-alloy may be a binary or ternary metal such as Ag—Al, Ag—Mo, Ag—Au, Ag—Pd, Ag—Ti, Ag—Cu, Ag—Au—Pd, or Ag—Au—Cu. The second transparent metal oxide layer 35 may have a thickness within a range of about 30 nm to about 60 nm. The second transparent metal oxide layer 35 may be formed of ITO ($In_2O_3+SnO_2$), IZTO ($ZnO+In_2O_3+SnO_2$), IZO ($In_2O_3+ZnO$), AZO (Al-doped ZnO), or GZO (Ga-doped ZnO).

In the present embodiment, the first transparent metal oxide layer 25 is directly in contact with the second lower transparent layer 31.

Figure 3:
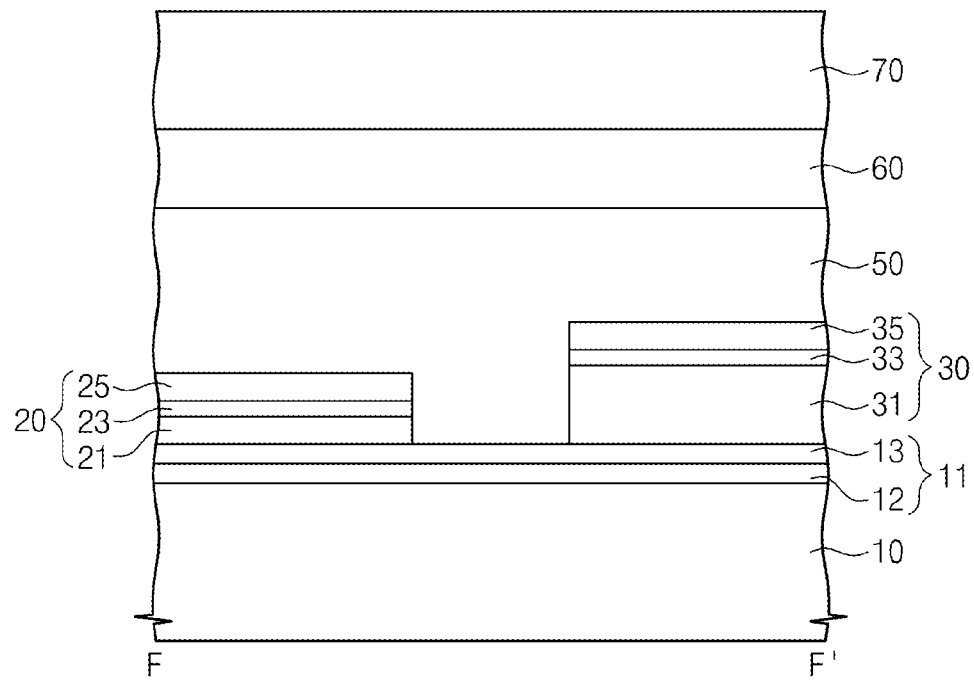
FIG. 3 is a cross-sectional view taken along a line E-E' of FIG. 1 to explain a touch screen panel according to some embodiments of the inventive concept.
Figure 4A:
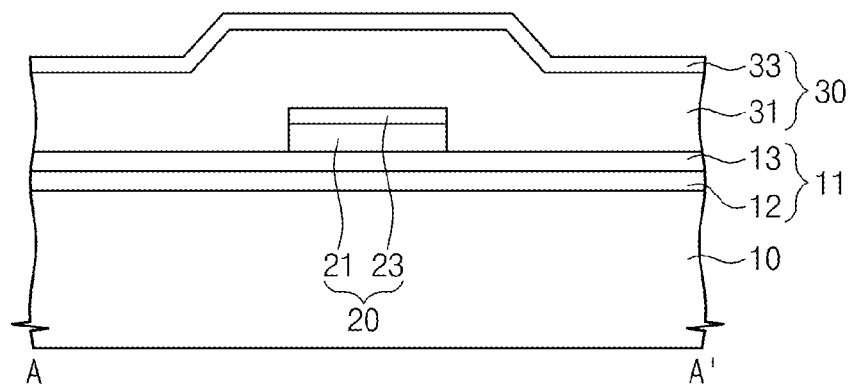
FIGS. 4A, 4B, 4C, 4D, and 4E are cross-sectional views taken along lines A-A', B-B', C-C', D-D', and E-E' of FIG. 1, respectively, to explain a touch screen panel according to other embodiments of the inventive concept.
Figure 4B:
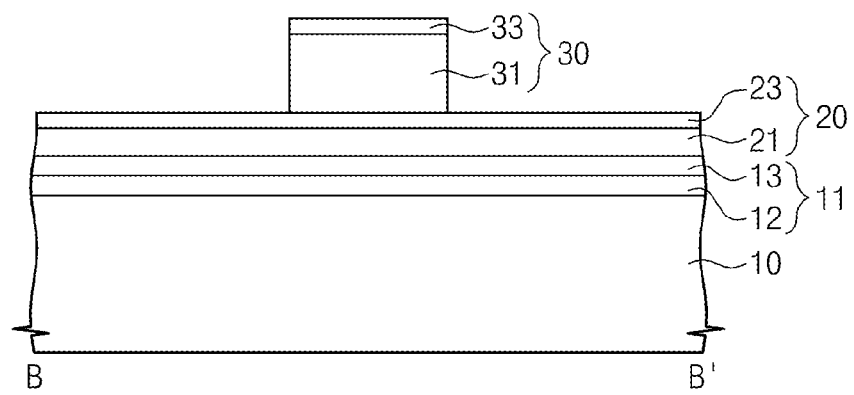
Figure 4C:
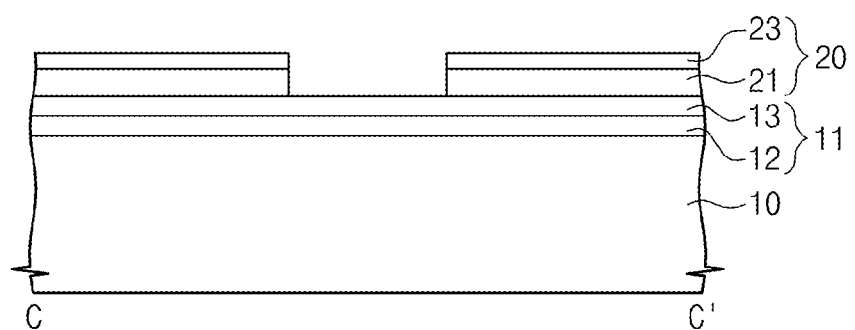
Figure 4D:
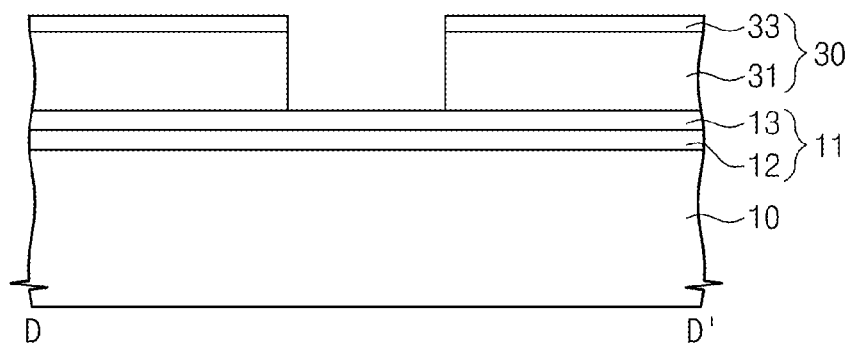
Figure 4E:
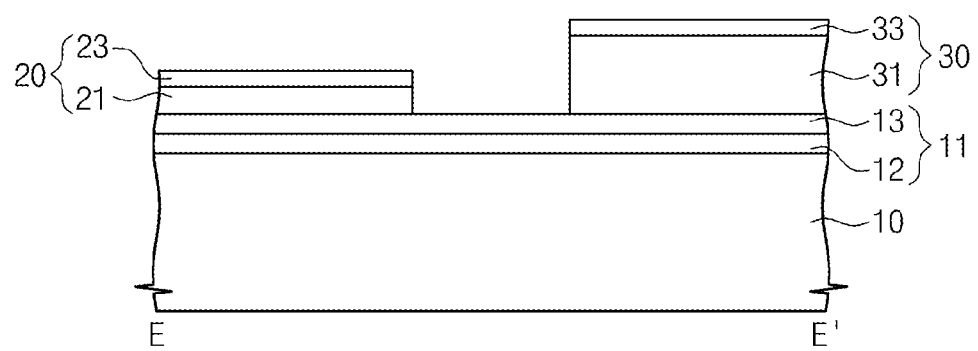

Referring to FIG. 3, a polarizing film 60 and a display device 70 may be formed on the first and second hybrid electrodes 20 and 30 and the first and second interconnections 41 and 42 with an optically clear adhesive 50 therebetween. The display device 70 may be a liquid crystal display (LCD) device, an organic light emitting diode (OLED) device, or an electrophoresis device.

FIGS. 4A, 4B, 4C, 4D, and 4E are cross-sectional views taken along lines A-A', B-B', C-C', D-D', and E-E' of FIG. 1, respectively, to explain a touch screen panel according to other embodiments of the inventive concept.

Referring to FIGS. 4A to 4E, a first hybrid electrode 20 is formed on the buffer layer 11. The first hybrid electrode 20 may include a first lower transparent layer 21 and a first metal layer 23 which are sequentially stacked. The first lower transparent layer 21 and the first metal layer 23 may be patterned simultaneously. As illustrated in FIG. 1, the first hybrid electrode 20 may include first electrode cells 20a arranged in the first direction, and first connection electrodes 20b connecting the first electrode cells 20a in the first direction. The first lower transparent layer 21 may have a refractive index within a range of about 1.9 to about 2.65. The first lower transparent layer 21 may have a thickness within a range of about 10 nm to about 30 nm. The first lower transparent layer 21 may be formed of at least one of ZnO, ZITO ($ZnO+In_2O_3+SnO_2$), $SiO_2$, $SnO_2$, ZTO ($ZnO+SnO_2$), $TiO_2$, AZO (Al-doped ZnO), GZO (Ga-doped ZnO), SiNx, ITO ($In_2O_3+SnO_2$), IZO ($In_2O_3+ZnO$), and any compound thereof. The first metal layer 23 may have a thickness within a range of about 6 nm to about 12 nm. The first metal layer 23 may be formed of Ag or an Ag-alloy. The Ag-alloy may be a binary or ternary metal such as Ag—Al, Ag—Mo, Ag—Au, Ag—Pd, Ag—Ti, Ag—Cu, Ag—Au—Pd, or Ag—Au—Cu.

A second hybrid electrode 30 is formed on the first hybrid electrode 20. The second hybrid electrode 30 may include a second lower transparent layer 31 and a second metal layer 33 which are sequentially stacked. The second lower transparent layer 31 and the second metal layer 33 may be patterned simultaneously. As illustrated in FIG. 1, the second hybrid electrode 30 may include second electrode cells 30a arranged in the second direction, and second connection electrodes 30b connecting the second electrode cells 30a in the second direction. The second lower transparent layer 31 may be an insulating layer having a refractive index within a range of about 1.9 to about 2.65. The second lower transparent layer 31 may have a thickness within a range of about 100 nm to about 300 nm. The second lower transparent layer 31 may be formed of at least one of $SiO_2$, $SiN_x$, $SiO_xN_y$, and $Al_2O_3$. The second lower transparent layer 31 may have a step-coverage of about 20% or more. The second lower transparent layer 31 may be formed by an IPVD process, an ALD process, a PE-CVD process, or a solution process. The second metal layer 33 may have a thickness within a range of about 6 nm to about 12 nm. The second metal layer 33 may be formed of Ag or an Ag-alloy. The Ag-alloy may be a binary or ternary metal such as Ag—Al, Ag—Mo, Ag—Au, Ag—Pd, Ag—Ti, Ag—Cu, Ag—Au—Pd, or Ag—Au—Cu.

In the present embodiment, the first metal layer 23 is directly in contact with the second lower transparent layer 31.

Figure 5:
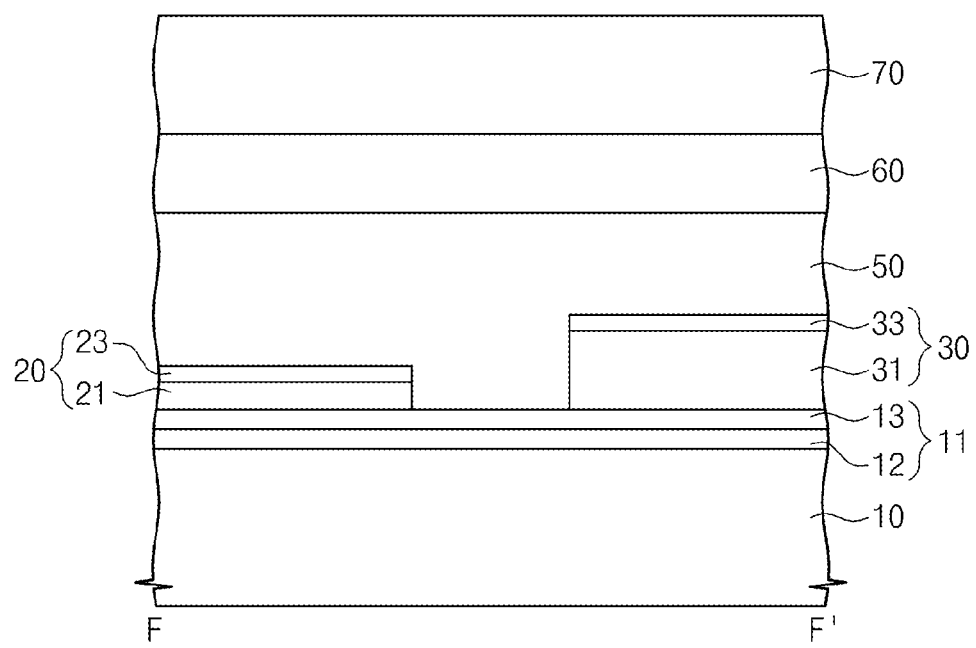
FIG. 5 is a cross-sectional view taken along a line E-E' of FIG. 1 to explain a touch screen panel according to other embodiments of the inventive concept.

Referring to FIG. 5, a polarizing film 60 and a display device 70 may be formed on the first and second hybrid electrodes 20 and 30 and the first and second interconnections 41 and 42 with an optically clear adhesive 50 therebetween. The display device 70 may be a LCD device, an OLED device, or an electrophoresis device.

According to embodiments of the inventive concept, an additional process or an additional interlayer insulating layer for insulation between the first and second hybrid electrodes 20 and 30 does not required. The second lower transparent layer 31 of the second hybrid electrode 30 may insulate the second hybrid electrode 30 from the first hybrid electrode 20. Thus, it is possible to reduce processes for deposition and patterning. For example, four or more masks may be required in a general method for manufacturing a touch screen panel. However, according to the embodiments of the inventive concept, three masks may be required in the method for manufacturing the touch screen panel.

Index matching of the touch screen panel according to embodiments of the inventive concept will be described.

Figure 6:
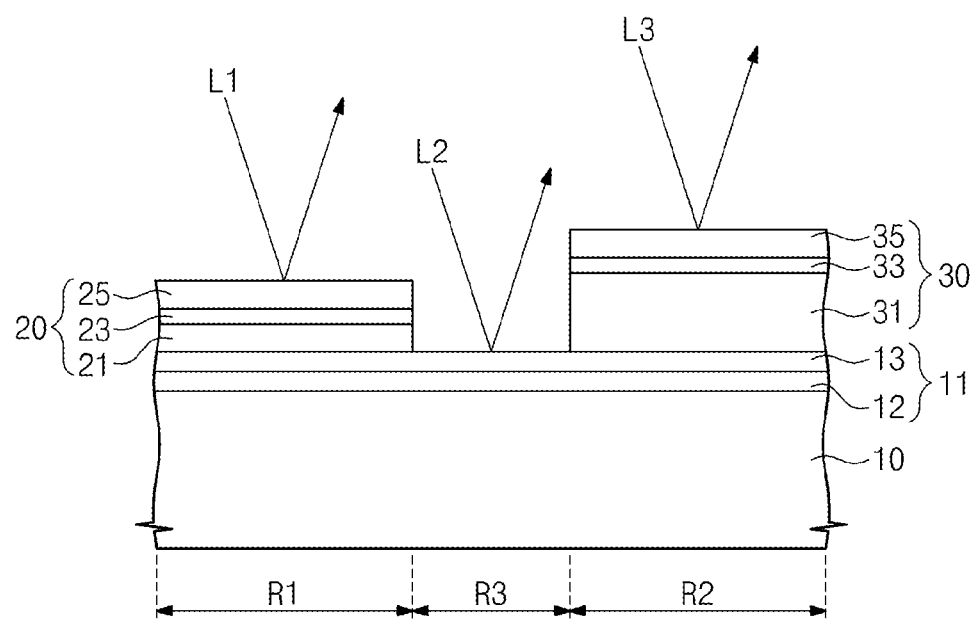
FIG. 6 is a cross-sectional view taken along a line E-E' of FIG. 1 to illustrate reflection of an incident light to a touch screen panel according to embodiments of the inventive concept.

According to embodiments of the inventive concept, the first hybrid electrode 20 and the second hybrid electrode 30 are spaced apart from each other by a distance of about 10 μm to 2000 μm for insulation therebetween. The buffer layer 11 under the first and second hybrid electrodes 20 and 30 is exposed by a gap between the first and second hybrid electrodes 20 and 30. The touch screen panel according to embodiments of the inventive concept includes a first region R1 of the first hybrid electrode 20, a second region R2 of the second hybrid electrode 30, and a third region R3 (e.g., a gap region) between the first hybrid electrode 20 and the second hybrid electrode 30 (FIGS. 1 and 6). Refractive indexes and thickness of materials respectively disposed on the first to third regions R1, R2, and R3 may be different from each other. Spectrums of lights L1, L2, and L3 respectively reflected from the first to third regions R1, R2, and R3 may be different from each other. As a result, the touch screen panel may have a speckle pattern.

Transmittance and reflectivity of light were simulated in each of the first to third regions R1, R2, and R3 of the touch screen panel according to some embodiments of the inventive concept.

Under an optimized condition as the following table 1, the reflectivity of the light having a wavelength of 550 nm was equal to or greater than 94%. Transmittance difference of light was equal to less than 0.3%. Reflectivity difference of light was equal to or less than 0.68%.

TABLE 1

| Layers | Refractive index | Thickness (nm) |
| --- | --- | --- |
| Buffer layer | 2.05 | 24 |
| First lower transparent layer | 2.65 | 18 |
| First metal layer | | 10 |
| First transparent metal oxide layer | | 42 |
| Second lower transparent layer | 2.65 | 100 |
| Second metal layer | | 10 |
| Second transparent metal oxide layer | | 42 |

Under a condition as the following table 2, the reflectivity of the light having a wavelength of 550 nm was equal to or greater than 94%. Transmittance difference of light was equal to less than 4%. Reflectivity difference of light was equal to or less than 1%.

TABLE 2

| Layers | Refractive index | Thickness (nm) |
| --- | --- | --- |
| Buffer layer | 1.7~2.65 | 6~80 |
| First lower transparent layer | 1.9~2.65 | 6~80 |
| First metal layer | | 6~12 |
| First transparent metal oxide layer | | 30~60 |
| Second lower transparent layer | 1.9~2.65 | 100~300 |
| Second metal layer | | 6~12 |
| Second transparent metal oxide layer | | 30~60 |

Similarly, transmittance and reflectivity of light were simulated in each of the first to third regions R1, R2, and R3 of the touch screen panel according to other embodiments of the inventive concept. Under a condition as the following table 3, the reflectivity of the light having a wavelength of 550 nm was equal to or greater than 85%. Transmittance difference of light was equal to less than 5%. Reflectivity difference of light was equal to or less than 2%.

TABLE 3

| Layers | Refractive index | Thickness (nm) |
| --- | --- | --- |
| Buffer layer | 2.0~2.7 | 10~30 |
| First lower transparent layer | 1.8~2.7 | 2~10 |
| First metal layer | | 5~10 |
| Second lower transparent layer | 1.8~2.7 | 100~300 |
| Second metal layer | | 5~10 |

As the aforementioned results of the simulations, according to embodiments of the inventive concept, the reflectivity difference in each of the first to third regions R1, R2, and R3 may be controlled to be equal to or less than 2% by controlling the refractive indexes and the thicknesses of the layers. As described above, the index matching condition may be optimized to increase visibility of the touch screen panel.

According to embodiments of the inventive concept, the touch screen panel may be manufactured without an interlayer insulating layer between the X-axis electrode and the Y-axis electrode. Thus, the manufacturing process may be simple and the manufacturing cost may be reduced.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A touch screen panel comprising:
    a substrate;
    a first hybrid electrode including first electrode cells arranged on the substrate in a first direction and first connection electrodes connecting the first electrode cells to each other in the first direction; and
    a second hybrid electrode spaced apart from the first hybrid electrode on the substrate, the second hybrid electrode including second electrode cells arranged in a second direction crossing the first direction and second connection electrodes connecting the second electrode cells to each other in the second direction, and the second electrode cells disposed between the first connection electrodes,
    wherein the first hybrid electrode includes a first lower transparent layer and a first metal layer which are sequentially stacked; and
    wherein the second hybrid electrode includes a second lower transparent layer and a second metal layer which are sequentially stacked.

2. The touch screen panel of claim 1, wherein the second connection electrodes extend on the first connection electrodes.

3. The touch screen panel of claim 2, wherein the first metal layer is directly in contact with the second lower transparent layer.

4. The touch screen panel of claim 2, wherein each of the first lower transparent layer and the second lower transparent layer has a refractive index within a range of about 1.9 to about 2.65.

5. The touch screen panel of claim 4, wherein the first lower transparent layer has a thickness within a range of about 10 nm to about 30 nm.

6. The touch screen panel of claim 4, wherein the second lower transparent layer has a thickness within a range of about 100 nm to about 300 nm.

7. The touch screen panel of claim 2, wherein the first metal layer and the second metal layer include Ag or an Ag-alloy.

8. The touch screen panel of claim 7, wherein each of the first and second metal layers has a thickness within a range of about 6 nm to about 12 nm.

9. The touch screen panel of claim 2, further comprising:
    a first transparent metal oxide layer on the first metal layer; and
    a second transparent metal oxide layer on the second metal layer.

10. The touch screen panel of claim 9, wherein the first transparent metal oxide layer is directly in contact with the second lower transparent layer.

11. The touch screen panel of claim 9, wherein each of the first and second transparent metal oxide layers includes ITO, IZTO, IZO, AZO, or GZO.

12. The touch screen panel of claim 11, wherein each of the first and second transparent metal oxide layers has a thickness within a range of about 30 nm to about 60 nm.

13. The touch screen panel of claim 1, further comprising:
    a buffer layer disposed between the substrate and the first hybrid electrode and between the substrate and the second hybrid electrode.

14. The touch screen panel of claim 13, wherein the buffer layer has a refractive index within a range of about 1.7 to about 2.65 and a thickness within a range of about 6 nm to about 80 nm.

15. The touch screen panel of claim 13, wherein the buffer layer includes a first buffer layer and a second buffer layer on the first buffer layer; and
    wherein the first buffer layer has a refractive index greater than a refractive index of the second buffer layer.

16. The touch screen panel of claim 1, further comprising;
    an optically clear adhesive disposed on the first hybrid electrode and the second hybrid electrode.

* * * * *